United States Patent
Ryan

(10) Patent No.: US 11,962,443 B2
(45) Date of Patent: Apr. 16, 2024

(54) FREQUENCY OFFSET ESTIMATION

(71) Applicant: Nordic Semiconductor ASA, Trondheim (NO)

(72) Inventor: Daniel Ryan, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 18/008,388

(22) PCT Filed: Jun. 8, 2021

(86) PCT No.: PCT/EP2021/065360
§ 371 (c)(1),
(2) Date: Dec. 5, 2022

(87) PCT Pub. No.: WO2021/250042
PCT Pub. Date: Dec. 16, 2021

(65) Prior Publication Data
US 2023/0283505 A1    Sep. 7, 2023

(30) Foreign Application Priority Data

Jun. 8, 2020 (GB) ..................... 2008616

(51) Int. Cl.
*H04L 27/22* (2006.01)
*H04B 1/00* (2006.01)
*H04L 27/233* (2006.01)

(52) U.S. Cl.
CPC ............... *H04L 27/2334* (2013.01)

(58) Field of Classification Search
CPC ......... H04L 27/2334; H04L 2027/0036; H04L 27/2331

(Continued)

(56) References Cited

U.S. PATENT DOCUMENTS

2014/0056392 A1    2/2014   Quanbeck

FOREIGN PATENT DOCUMENTS

| WO | WO 2014/167318 A2 | 10/2014 |
| WO | WO 2019/134947 A2 | 7/2019 |
| WO | WO 2019/207009 A1 | 10/2019 |

OTHER PUBLICATIONS

IPO Search Report under Section 17(5) for GB2008616.1, dated Feb. 24, 2021, 3 pages.

(Continued)

*Primary Examiner* — Tanmay K Shah
(74) *Attorney, Agent, or Firm* — Klarquist Sparkman, LLP

(57) ABSTRACT

A receiver comprises a matched filter bank, decision logic and a frequency offset estimator. The matched filter bank comprises an input for receiving data representative of a frequency- or phase-modulated signal. The decision logic generates a sequence of demodulated symbol values from outputs of the matched filter bank. The frequency offset estimator determines a first phase value from a first output and a second phase value from a second output of the matched filter bank, the second output being offset from the first by L symbol periods. It also determines a phase adjustment value from an L-symbol subsequence within the sequence of demodulated symbol values, each subsequence value being determined from values output by the matched filter bank between the first and second outputs. It estimates a frequency offset based on the difference between the first phase value plus the phase adjustment value, and the second phase value.

20 Claims, 6 Drawing Sheets

(58) Field of Classification Search
USPC .......................................................... 375/322
See application file for complete search history.

(56) References Cited

OTHER PUBLICATIONS

International Search Report and Written Opinion for PCT/EP2021/065360, dated Sep. 7, 2021, 13 pages.
Mengali et al., "*Synchronization Techniques for Digital Receivers*," New York, Plenum Press, 1997, pp. 96-99.
Meyr et al., "*Digital Communication Receivers Synchronization and Channel Estimation, and Signal Processing*," vol. 444, New York: Wiley 1998, pp. 478-490.

FREQUENCY OFFSET ESTIMATION

CROSS REFERENCE TO RELATED APPLICATIONS

This is the U.S. National Stage of International Application No. PCT/EP2021/065360, filed Jun. 8, 2021, which was published in English under PCT Article 21(2), which in turn claims the benefit of Great Britain Application No. 2008616.1, filed Jun. 8, 2020.

BACKGROUND OF THE INVENTION

This invention relates to apparatus and methods for estimating a frequency offset in a receiver system.

Transmissions systems are known for transmitting signals from a transmitter to a receiver. In some systems, digital message data is modulated on a frequency- or phase-modulated carrier signal. Examples include Bluetooth™ and Bluetooth Low Energy (BLE)™, which use Gaussian FSK (GFSK) modulation. In binary frequency-shift key (FSK) modulation, data is encoded by the transmitter transmitting one of two different frequencies, offset either side of a carrier frequency. The modulation may be applied so that the phase of the transmitted signal is continuous using continuous-phase FSK (CP-FSK). GFSK is a type of CP-FSK in which spectral leakage is reduced by Gaussian shaping of the modulating data signal.

Receivers can use coherent detection, in which the receiver uses knowledge of the phase of the carrier to demodulate the signals, or non-coherent detection in which a phase reference is not used. A known approach for non-coherently demodulating a signal is to use a matched filter bank (MFB), which cross-correlates the incoming sampled signal with a bank of predetermined filter sequences, representing respective waveforms corresponding to different modulated data, in order to determine the most likely symbol sequence that is communicated by a particular portion of the incoming signal.

If a reference clock used by the receiver is not locked to a reference clock of the transmitter, there is the potential for a frequency mismatch, or offset, to be present.

Such a frequency offset can result in the receiver inaccurately demodulating frequency- or phase-modulated data.

A known preamble or training sequence can be used to generate an initial frequency offset estimate, which can be used to apply compensation—e.g. by rotating incoming samples through an appropriate phase angle. However, the frequencies may continue to drift during the course of receiving a data packet. It can therefore be desirable to continue estimating the frequency estimate while receiving arbitrary message data.

It is known from the applicant's earlier patent applications WO 2014/167318 and WO 2019/134947 to determine a difference in the output phase of a particular filter in the MFB at two different points in a received GFSK-modulated signal, where there has been an equal number of demodulated "0" and "1" bits between the two points, and to use this phase difference to determine an estimate of the frequency drift between the transmitter and the receiver.

Such an approach can work well for short filter sequences (e.g. 3 bits long), but can lead to delays in generating a frequency offset estimate when using longer filter sequences (e.g. 5 bits or more), since the occurrence of an equal number of zeros and ones between two matches of the same filter sequence becomes progressively rarer for longer filter sequences. The frequency estimates can therefore arrive too late to be useful. They may also be inaccurate as the frequency may have drifted in different ways and/or the receiver may have made different adjustments over the observation window, such that the frequency estimate does not provide any useful information.

There is also a greater risk of the phase wrapping within the observation window.

The present invention seeks to provide an alternative approach to estimating a frequency offset.

SUMMARY OF THE INVENTION

From a first aspect, the invention provides a method of estimating a frequency offset in a receiver system that is configured to:
   provide data representative of a frequency- or phase-modulated signal to a matched filter bank; and
   generate a sequence of demodulated symbol values from outputs of the matched filter bank,
the method comprising:
   determining a first phase value from a first output of the matched filter bank;
   determining a second phase value from a second output of the matched filter bank, wherein the second output is offset from the first output by an offset number, L, of symbol periods;
   determining a phase adjustment value from an L-symbol subsequence within the sequence of demodulated symbol values, wherein each of the L symbol values is determined at least in part from a respective one or more values output by the matched filter bank during a time interval from the first output to the second output; and
   estimating a frequency offset in dependence on the difference between i) the first phase value plus the phase adjustment value and ii) the second phase value.

From a further aspect, the invention provides a receiver system comprising:
   a matched filter bank;
   decision logic; and
   a frequency offset estimator,
wherein:
   the matched filter bank comprises an input for receiving data representative of a frequency- or phase-modulated signal;
   the decision logic is configured to generate a sequence of demodulated symbol values from outputs of the matched filter bank;
   the frequency offset estimator is configured to:
      determine a first phase value from a first output of the matched filter bank;
      determine a second phase value from a second output of the matched filter bank, wherein the second output is offset from the first output by an offset number, L, of symbol periods;
      determine a phase adjustment value from an L-symbol subsequence within the sequence of demodulated symbol values, wherein each of the L symbol values is determined at least in part from a respective one or more values output by the matched filter bank during a time interval from the first output to the second output; and
      generate a frequency offset estimate by estimating a frequency offset in dependence on the difference between i) the first phase value plus the phase adjustment value and ii) the second phase value.

Thus it will be seen that, in accordance with the invention, a frequency offset estimate is determined between two MFB outputs that are offset from each other within the signal, but without requiring particular conditions to be met on the demodulated data between these positions. Instead, the demodulated symbol history is used to determine a phase adjustment value. This adjustment value can account for the effect on the phase of the particular data that is received over an interval corresponding to the offset amount of L symbols. In this way, the offset interval of L symbols-which determines the length of an observation window over which the frequency offset is estimated—can be set without dependence on the actual data that is transmitted, and without any direct dependence on the length of the filter sequences in the matched filter bank.

The first and second phase values are influenced by a combination of the channel phase (relating to the separation distance between the transmitter and the receiver), the data received up until the respective outputs, and any frequency-offset phase error. By generating the frequency offset in dependence on the difference between the first and second phase values, the channel phase can be disregarded. The phase adjustment value can correct for the actual data demodulated during the observation window L. Thus, the difference can provide an estimate of the phase error due to the frequency offset between the transmitter and the receiver (assuming the channel phase remains constant).

By using outputs from the MFB to estimate the frequency offset, the frequency offset estimate may be generated with minimal delay. In some embodiments, the estimate may depend on data representative of one or more symbol positions in the signal for which the decision logic has not yet determined respective demodulated symbol values—e.g. depending on data that has been processed by the MFB to generate soft-decision data for a particular symbol position, but where the decision logic (and/or any optional downstream decoder, such as a Viterbi decoder) has not yet processed further soft-decision data from later-received samples in order to be able to generate a demodulated value for the symbol position. This can allow for very fast tracking of the frequency offset which is not dependent on the latency of the decision logic and/or of any downstream decoder.

In some embodiments, the matched filter bank provides a bank of filters having a common length—e.g. K=2, 3, 5, 7 or more symbols long. A symbol may be one bit, two bits (e.g. when receiving a quadrature modulated signal), or any other length.

The offset number, L, may be less than, or equal to, or greater than a filter length, K, of the MFB. The ability to set the offset independently of the filter length provides greater flexibility than the known approaches discussed above.

The receiver system may be configured to generate a succession of frequency offset estimates, which may be at regular intervals—e.g. one every symbol period. The frequency offset estimator may output a frequency control signal in dependence on the estimate or estimates of frequency offset. It may apply a damping operation to a succession of frequency offset estimates, e.g. to scale the change to the control signal provided by each individual estimate. The receiver system may be configured to use each estimated frequency offset to apply a respective frequency-offset compensation operation, such as a complex rotation, to the data representative of the frequency- or phase-modulated signal. The receiver system may be configured to use each estimated frequency offset to control an analogue or digital local oscillator signal.

The receiver system may be a non-coherent receiver system. It may comprise a correlator configured to determine an initial frequency offset estimate—e.g. by cross-correlating at least some of the data representative of the signal against one or more templates. The initial frequency offset estimate may be determined from a predetermined preamble portion of the signal.

The first and second outputs of the MFB may be outputs of a respective best-matched filter in the MFB. In contrast with earlier approaches, this need not be the same filter for both outputs. Each output may comprise a complex correlation coefficient. The receiver system may comprise a CORDIC (coordinate rotation digital computer) circuit for determining a respective phase value from each output. The frequency offset estimator may be configured to determine respective phase values at intervals—e.g. every symbol period. It may comprise shift register configured to store one or more phase values. It may comprise a subtractor configured to subtract the oldest phase value in the shift register from a phase value determined L symbol periods later. In this way, a difference between the first phase value and the second phase value can be calculated; this can be repeated at regular intervals, e.g. every symbol period. In some embodiments, the shift register is L-symbols long and a new phase value is loaded to the shift register every symbol period. The phase adjustment value may be applied to this difference separately, as disclosed below.

The second phase value may be output later than first phase value by L symbol periods.

The offset number L is preferably greater than one. This can provide a more accurate frequency offset estimate—e.g. having a better signal-to-noise ratio.

The frequency offset may be a linear function of the difference between i) the first phase value plus the phase adjustment value and ii) the second phase value. It may be determined by subtracting the second phase value from the first phase value, and by subtracting (or adding) the phase adjustment value. The frequency offset estimator may comprise a divider configured to divide this difference by the offset number L.

The offset number L may be an integer power of two (e.g. L=4, 8 or 16). This can facilitate simpler division, using hardware or software bit shifting, rather than requiring a divider.

The phase adjustment value may be determined from the most recently demodulated L symbols. This ensures the frequency offset estimate is as fresh as possible.

When using binary symbols, the phase adjustment value may be determined by successively summing positive or negative values—e.g. +1 or −1—each selected in dependence on whether a respective demodulated bit is a one or a zero. The summed values may additionally depend on a modulation index value, which may be preconfigured or which may be estimated from the modulated signal. More generally, the receiver system may be configured to receive or generate a modulation index parameter (a known value or an estimate) and to use this parameter when calculating the phase adjustment value.

In some embodiments, determining the phase adjustment value comprises storing L phase-shift values in an L-symbol long shift register, which may be incremented as each successive demodulated symbol value is determined. Each stored phase-shift value may be calculated as a sum of L respective values each of which depends on a respective demodulated symbol value in the sequence of demodulated symbol values. When a phase-shift value is clocked out of the shift register it may be added to an accumulated phase-shift value to provide the phase adjustment value, which may be output to a subtractor.

The decision logic may comprise majority-vote logic, or any other appropriate demodulating logic. Each demodulated symbol value may be determined based on a single best-matched filter in the filter bank, but in other embodiments it is determined based on a plurality of outputs of the matched filter bank from a plurality of different times. The decision logic may be configured to determine a single respective demodulated hard-decision symbol value for each symbol position, or may be configured to determine a single respective demodulated soft-decision symbol value (e.g. a value in the interval [0, 1], when using binary symbols) for each symbol position. Each hard or soft demodulated symbol value, for a respective symbol position, may be determined from a set of respective soft-bit values determined from multiple observations of the symbol position by the matched filter bank—e.g. being determined by a majority vote. The decision logic may, in some embodiments, output hard or soft demodulated symbol values to a decoder, such as a Viterbi decoder, which may further decode the symbols—e.g. where the data is encoded using forward error correction (FEC). However, this is not essential.

The data representative of the frequency- or phase-modulated signal may comprise a sequence of sample values, which may be complex values. It may be stored in a memory (e.g. RAM) or in registers. The samples may be at baseband. The receiver system may comprise an analogue-to-digital converter (ADC) for sampling the received frequency-modulated signal. It may comprise an analogue or digital mixer for down-mixing the received signal—e.g. to baseband.

The frequency- or phase-modulated signal may be a received signal—e.g. being received by the receiver system from a separate transmitter system, over a wired or wireless channel. Methods disclosed herein may comprise receiving the frequency- or phase-modulated signal. The received signal may be a radio signal. It may be modulated around a carrier frequency, e.g. around 2.4 GHz. It may be a Bluetooth™ or BLE signal. The signal may be received at an antenna of the receiver system. The receiver system may comprise circuitry for generating the data representative of the received signal, from the received signal—e.g. for down-mixing and sampling the received signal.

The frequency- or phase-modulated signal may be a frequency-shift-key (FSK) modulated signal. It may be a binary-FSK signal. It may be a CP-FSK signal. It may be a GFSK signal. It may be modulated using minimum-shift keying (MSK), differential phase-shift keying (DPSK), offset quadrature phase-shift keying (OQPSK), or continuous phase modulation (CPM). It may be modulated in amplitude as well as phase and/or frequency—e.g., using quadrature amplitude modulation (QAM).

The signal may encode part or all of a data packet—e.g. a BLE baseband packet. The signal may comprise a preamble portion and a message-data portion. The preamble portion may be at or near the beginning of the signal and may encode predetermined preamble data. A message-data portion may encode message data that is not known in advance to the receiver system.

The receiver system may be or comprise receiver apparatus such as a radio receiver or transceiver. It may be or comprise an integrated-circuit device—e.g., a silicon chip. The matched filter bank and/or decision logic and/or frequency offset estimator may be implemented wholly or partly in software, but in one set of embodiments at least one or all of these modules are dedicated hardware circuits, distinct from any processor. They may be integrated on a system-on-chip device. The receiver system may comprise any one or more of: a power supply, an antenna, a crystal, a low-noise amplifier, a local oscillator, an analogue mixer, a digital mixer, an ADC, discrete capacitors, discrete resistors, etc. It may comprise a processor and a memory for storing software instructions for execution by the processor. It may comprise one or more processors, DSPs, logic gates, amplifiers, filters, digital components, analogue components, non-volatile memories (e.g., for storing software instructions), volatile memories, memory buses, peripherals, inputs, outputs, and any other relevant electronic components or features.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
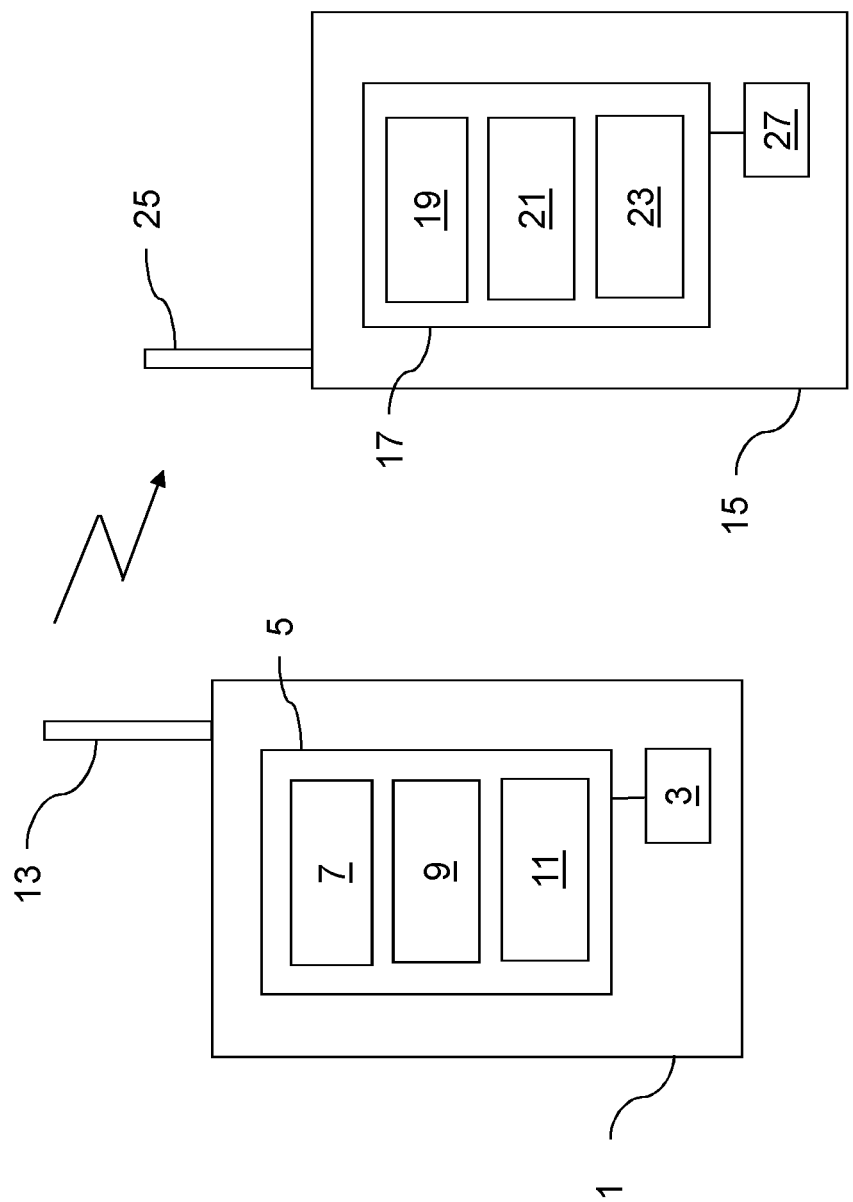
FIG. 1 is a schematic drawing of a radio communication system including a radio receiver embodying the invention.

FIG. 1 shows a radio transmitter device 1 which is in communication with a radio receiver device 15. The radio receiver device 15 embodies the present invention.

The radio transmitter device 1 has a sensor 3 (e.g. a temperature sensor) which is connected to a system-on-chip (SoC) 5. The SoC 5 comprises radio transceiver circuitry 7 and a microprocessor 9, such as an ARM™ Cortex M-series processor, for executing software stored in a memory 11. The device 1 may also contain other components, such as a battery, crystal oscillator, discrete components, etc., which are omitted from the FIG. 1 for simplicity. The radio transceiver circuitry 7 is connected to a radio antenna 13, for transmitting and receiving radio signals.

The radio receiver device 15 has a system-on-chip (SoC) 17, comprising radio transceiver circuitry 19, a microprocessor 21, such as an ARM™ Cortex M-series processor, and a memory 23 for storing software to be executed by the microprocessor 21. The radio transceiver circuitry 19 is connected to an antenna 25 for receiving and transmitting radio signals. The SoC 17 is connected to an output peripheral 27, such as a display screen, for outputting a response which may be based, at least in part, on data received by the radio transceiver circuitry 19 through the antenna 25. The receiver device 15 may contain other components (not shown), such as a battery, crystal oscillator, discrete components, further microprocessors, etc.

In use, the radio transmitter device 1 transmits data packets from the antenna 13, modulated on a radio-frequency carrier (e.g. at around 2.4 GHz), using two-level GFSK with a modulation index h. (The modulation index h is the difference between the two frequencies in the two-level FSK signal, divided by the bitrate of the encoded data stream.) The data packet comprises a predetermined synchronization sequence and a message-data portion. It may also include one or more of address data, a link-layer identifier, packet-length data, and any other appropriate elements. A preamble portion of the packet, for the purposes of the cross-correlations described below, may comprise some or all of the synchronization sequence and/or some or all of the address or link-layer data. The radio receiver device 15 is configured to receive, demodulate (i.e. detect) and decode such data packets. It may also transmit similar data packets. The data packets may comply with some or all parts of a version of the Bluetooth Low Energy (BLE)™ core specification, e.g. Bluetooth™ 5. The radio receiver device 15 may be a BLE receiver. The packets may be communicated over a standard-range 1 Mbps or 2 Mbps BLE physical transport layer (PHY) connection, or over a long-range 125 kbps or 500 kbps BLE connection, or any other appropriate radio connection.

The radio transceiver circuitry 19 in the radio receiver device 15 uses a matched filter bank (MFB) to implement non-coherent detection (i.e. non-coherent demodulation) of incoming data. The MFB may observe a number, K, of bits at a time. This observation interval could be K=3, 5 or 7 bits long, or any other suitable length.

The radio transceiver circuitry 19 uses a clock reference (e.g. derived from a quartz crystal in the receiver device 15) to demodulate incoming signals. This clock reference is intended to match a clock reference used by the transceiver circuitry 7 in the transmitter device 1. However, there will typically some mismatch in these clock references, resulting in a frequency offset between an expected frequency of the incoming signal received at the antenna 25 of the receiver device 15 and the actual incoming frequency. This offset may change during the transmission of a data packet—e.g. due to clock drift at the transmitter 1 or receiver 15, or due to changing channel conditions such as relative motion between the transmitter 1 and the receiver 5 (e.g. Doppler shift).

The receiver device 15 can therefore continually estimate a frequency offset, while receiving a modulated signal, in order to improve the accuracy of the demodulation. This is described in more detail below. It does so by estimating a phase offset over a fixed time interval. (Instantaneous frequency is simply the time derivative of instantaneous phase).

Figure 2:
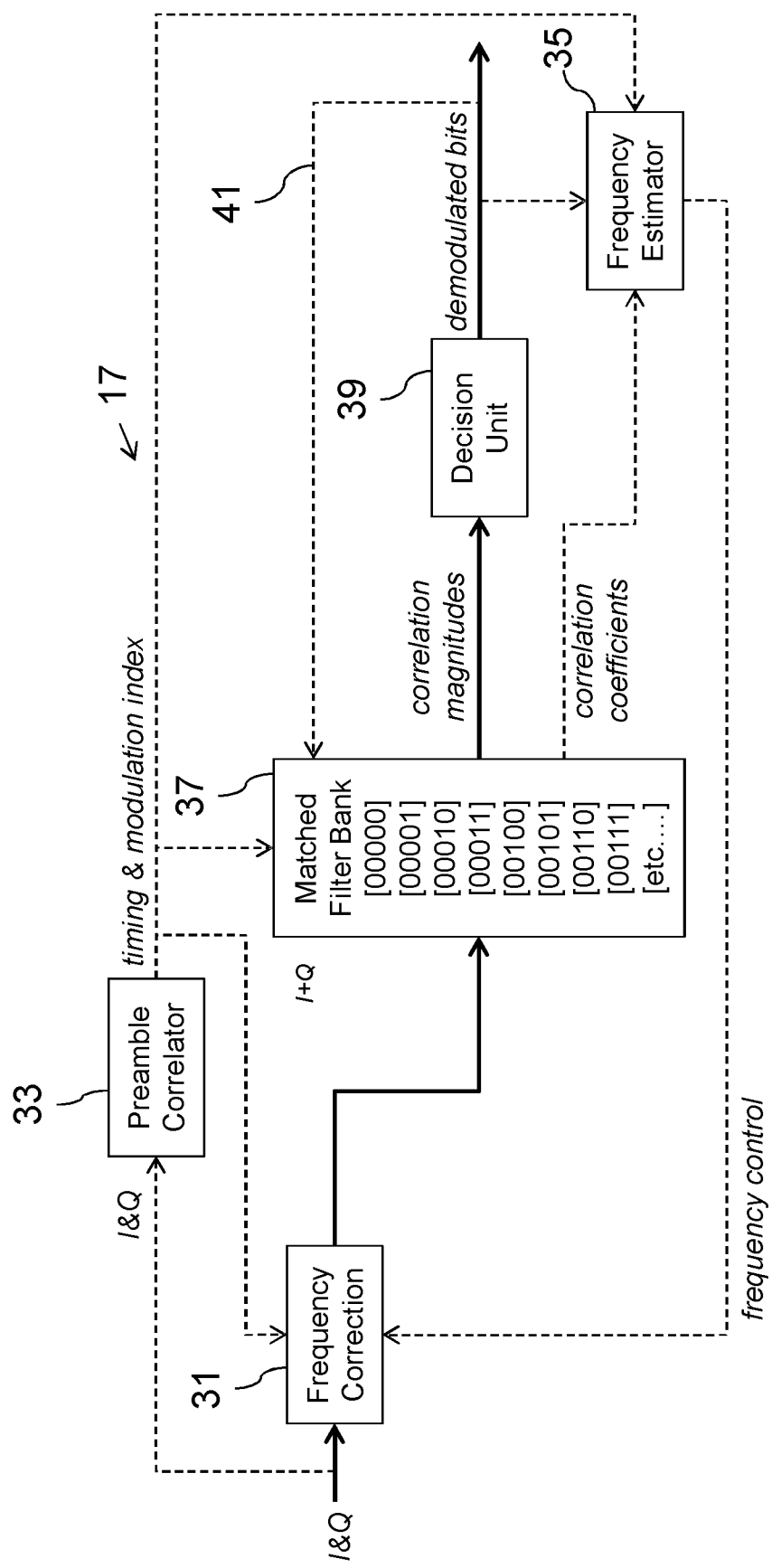
FIG. 2 is a schematic drawing of functional units within the receiver circuitry of the radio receiver.

FIG. 2 shows various functional blocks provided by the system-on-chip (SoC) 17 that are used in demodulating an incoming two-level CP-FSK encoded radio signal. Each of these blocks may be implemented using dedicated circuitry in the radio transceiver circuitry 19—e.g. as blocks comprising application-specific registers and logic gates. However, in some embodiments, one or more operations of one or more blocks may be implemented by software, e.g. executing on the microprocessor 21. A pure software implementation is possible, but may be undesirable for performance reasons.

The radio transceiver circuitry 19 may use any combination of amplifiers, mixers, filters, analogue-to-digital converters, etc. to generate a sampled radio signal, from a received analogue radio signal, comprising a sequence of complex-valued digital samples, I & Q, at baseband. These samples represent the radio signals received around a particular carrier frequency—e.g. in a band within the 2.4 GHz spectrum. The signal may be oversampled by a factor R. In some examples, R=8, although it could take any suitable value.

The principal signal path through the components of FIG. 2 is shown using solid arrows, while control and feedback paths are shown using dashed arrows.

The stream of complex baseband samples, I & Q, is input to a frequency correction block 31. This performs complex rotation of the samples to compensate for any frequency offset, based on frequency-offset information received from a preamble correlator 33 and from a frequency offset estimator 35. The frequency correction block 31 may comprise one or more CORDIC circuits for performing the rotation.

The stream of complex baseband samples is also input to the preamble correlator 33. This determines an initial frequency offset estimate (e.g. arising from an offset between an oscillator of the receiver 15 and an oscillator of the transmitter 7). This frequency offset estimate is subsequently refined as the rest of the packet is received by the output of the frequency estimator 35, which determines further frequency offset estimates periodically, from the rest of the data packet (e.g. from the payload message data).

The preamble correlator 33 also determines an estimate of the modulation index, and performs timing recovery and frame synchronization, to enable the receiver 15 to demodulate the signal more accurately.

The preamble correlator 33 determines these values by cross-correlating the incoming samples against a set of stored templates. The templates are all based on a common fixed preamble bitstream that is encoded by each data packet intended for the receiver 15, but each template is generated using a different assumed modulation index. Each template comprises a sequence of (complex) coefficients that represents the modulated baseband waveform of the preamble.

The preamble may comprise part or all of a constant synchronization sequence that is present in every data packet within the system, and/or part or all of an address of the receiver 15 and/or part or all of a channel or link identifier and/or any other appropriate data. When receiving BLE data packets, the preamble correlator 33 may, for example, use 16-bit preamble sequences, consisting of the last two bits of the BLE Preamble field and the first fourteen bits of the Address field. The preamble used by the correlator may, at least for some packets, precede message data encoded in the data packet.

The preamble correlator 33 is a data-aided joint timing and frequency estimator. It exploits knowledge of the data in the received symbols to cancel the effect of the FSK modulation on the estimate of a delay-and-correlate type of carrier-frequency offset estimator. The principle behind the synchronization used in these embodiments may be as described with reference to the double correlator in WO 2014/167318, by the present applicant, the entire contents of which are hereby incorporated by reference.

In detail, to determine an initial frequency offset and timing, the preamble correlator 33 identifies, for one of the templates, the temporal position of a peak in the correlation coefficient of a cross-correlation (performed every sample) between the incoming sample stream and the template. It may be sufficient to use just one template for frequency offset and timing estimation—e.g. the template generated using a most central modulation index of all the modulation index hypotheses.

More specifically, the carrier frequency offset estimator is given by:

$$\Delta \hat{f} = \frac{1}{2\pi DT} \arg\left\{\sum_{i=0}^{L-1} [z_{n-i} z^*_{n-i-D}] d_i\right\} \quad (1)$$

where:
- L is the correlation length [note this is not the same parameter as the offset interval used in the frequency offset estimator block 35, which is also labelled L];
- D is a delay value (e.g. D=16 samples, corresponding to two bit periods; D may be chosen such that a maximum frequency offset is not breached, i.e. DT<1/(2Δf$_{max}$));
- z represents the complex (I & Q) baseband samples;
- $d_i = p_i^* p_{i+D}$ where p are the samples of the up-sampled packet synchronization preamble waveform; and
- T is the sample rate period.

The correlation length, L, could be 24, 128 or 192, or any other appropriate value. In general the correlation length is a trade-off between estimation accuracy, implementation cost, and the length of the known preamble data (e.g. from a preamble or sync word, such as an access address).

Packet detection is achieved when a peak is detected in equation (2):

$$M_n = \frac{|C_n|}{P_n}, \text{ where} \quad (2)$$

$$C_n = \sum_{i=0}^{L-1} [z_{n-i} z^*_{n-i-D}] d_i \text{ and} \quad (3)$$

$$P_n = \sum_{i=0}^{L-1} |z_{n-i-D}|^2 \quad (4)$$

The sample time of the packet detection peak provides the frame synchronization. The preamble correlator 33 implements operations based on equations (2) to (4) to perform a complex correlation between the complex baseband samples and the template samples. The preamble correlator 33 normalizes (scales) the magnitude of the correlator peak in equation (2) using a measure of signal power, P, from equation (4). A valid peak in (2) is determined against a configurable threshold. This threshold will typically be set in the range 0.7-0.8.

Equation (1) can be rewritten in polar form as:

$$\Delta \hat{f} = \frac{1}{2\pi DT} \arg\left\{\sum_{i=0}^{L-1} [z_{n-i} z^*_{n-i-D} p_i^* p_{i+D}]\right\} \quad (5)$$

$$= \frac{1}{2\pi DT} \arg\left\{\sum_{i=0}^{L-1} [r_{n-i} e^{j(\theta_{n-i}+\varphi_{n-i})} r_{n-i-D} e^{-j(\theta_{n-i-D}+\varphi_{n-i-D})} u_i e^{-j\gamma_i} u_{i+D} e^{j\gamma_{i+D}}]\right\}$$

$$= \frac{1}{2\pi DT} \arg\left\{e^{j\varphi_\Delta} \sum_{i=0}^{L-1} [r_{n-i} e^{j\theta_{n-i}} r_{n-i-D} e^{-j\theta_{n-i-D}} u_i e^{-j\gamma_i} u_{i+D} e^{j\gamma_{i+D}}]\right\}$$

where {r,u} are the magnitudes of the complex numbers. Assuming that the carrier frequency offset is approximately constant, $\varphi_\Delta$ is the change of phase over D samples.

When synchronized (i.e. when equation (2) peaks), the sample angles track the coefficient angles ($\theta_{n-i} \approx \gamma_i$) and equation (5) may be rewritten as:

$$\Delta \hat{f} = \frac{1}{2\pi DT} \arg\left\{e^{j\varphi_\Delta} \sum_{i=0}^{L-1} [r_{n-i} r_{n-i-D} u_i u_{i+D} e^{j(\theta_{n-i}-\theta_{n-i-D})} \cdot e^{-j(\gamma_i-\gamma_{i+D})}]\right\} \quad (6)$$

$$\approx \frac{1}{2\pi DT} \arg\left\{e^{j\varphi_\Delta} \sum_{i=0}^{L-1} [r_{n-i} r_{n-i-D} u_i u_{i+D}]\right\} = \frac{\varphi_\Delta}{2\pi DT}$$

If T=125 ns and D=16, the maximum carrier frequency offset that can be estimated (in either direction) is $$\Delta \hat{f}_{max} \approx \frac{1}{2\pi \cdot 16 \cdot 0.125 \cdot 10^{-6}} \cdot \pi = 250 \text{ kHz}$$

The initial carrier frequency offset estimate is valid when there is high correlation, i.e. when equation (2) peaks. Therefore this estimator jointly estimates carrier frequency offset and timing. Assuming $u_1=1$, the sum in equation (6) effectively evaluates the energy in the L baseband samples at the time of correlation. This value is normalized with P in equation (2) before the preamble correlator 33 compares the (normalized) correlation coefficient with a threshold, e.g. in the range 0.7-0.8. A value of D=16 was chosen in one example, as the corresponding carrier frequency offset estimator range of +/−250 kHz supports a crystal specification of 50 ppm which may be sufficient in many applications, but other values could be used.

By performing timing recovery, frame synchronization and initial frequency offset estimation in one joint operation, the preamble correlator 33 is ideal for situations where synchronization must be performed quickly.

In order to estimate the modulation index, the preamble correlator 33 cross-correlates the incoming signal with two or more templates-either in parallel, or by performing the cross-correlation operations (e.g. vector dot product calculations) for the different templates at different times (i.e. serially). Performing the operations serially can enable the preamble correlator 33 to generate a correlation coefficient for each further template by performing a single respective dot product calculation. The preamble correlator 33 may be reconfigured, using the coefficients of the one or more further templates, for each template in turn, once frame synchronization has been successfully achieved.

Performing a further cross-correlation operation with different coefficients loaded in the preamble correlator 33, corresponding to one or more further templates, can also enable further frequency offset estimates to be obtained, which may be combined with the original frequency offset (e.g. by averaging) to obtain a more accurate estimate of the initial frequency offset.

After frame synchronization has been attained using a first template, the preamble correlator 33 is reconfigured with the correlation coefficients of the next template. A new normalized peak correlation coefficient is determined, based on equation (2) above. If frame synchronization has already been established, only a single correlation coefficient need be calculated for each further template, which will be at the peak location already.

The preamble correlator 33 compares the normalized peak correlation coefficients across the set of templates to identify the highest peak. The template having the highest peak determines a modulation index estimate that is output by the preamble correlator 33 to the matched filter bank 37 and to the frequency offset estimator 35.

Symbol and frame (i.e. packet) timing information determined by the double correlator 33 are output to the frequency correction block 31. The initial frequency estimate may be accurate to within around 10 kHz or less, in order to avoid significant sensitivity degradation.

The frequency correction block 31 applies a complex rotation to the sample stream to compensate it for the estimated frequency offset. The rotation also takes account of real-time drift as the packet is received, using the output of the frequency offset estimator 35.

The timing information and the estimated modulation index are also output from the preamble correlator 33 to a matched filter bank (MFB) 37 and to the frequency estimator 35.

The matched filter bank 37 receives the stream of frequency-corrected samples from the frequency correction block 31, to which it applies a set of filters, each K bits long. In FIG. 2, K=5, but K could be 3, 4, 7, 11 or any other length. Each filter of the MFB 37 performs a complex cross-correlation between the sampled signal and a respective filter sequence of coefficients that represents a baseband waveform modulated according to a respective bit pattern. The MFB 37 uses the modulation index estimate, $\hat{h}_{TX}$, received from the preamble correlator 33 to adjust the filter sequence coefficients.

At each time step, the matched filter bank 37 generates a set of $2^K$ complex correlation coefficients, one for each filter in the selected set, representing the degree of correlation between a window of the incoming samples and the respective template.

The MFB 37 computes a real-valued modulus of each coefficient and outputs these as a set of $2^K$ correlation strength values to a decision unit 39. In some embodiments, the MFB 37 may be implemented similarly to the MFB disclosed in the applicant's earlier application WO 2019/134947, the entire contents of which are hereby incorporated by reference, with the modulation index h being determined from the estimate output by the preamble correlator 33.

The decision unit 39 receives this correlation-strength data and processes it to generate a sequence of detected hard bits (i.e. 0 or 1 values). This processing may be similar or the same as that described for the decision unit in the applicant's earlier application WO 2019/207009, the entire contents of which are hereby incorporated by reference. In other embodiments, the MFB output may be processed using majority voting principles as disclosed in WO 2014/167318. The decision unit 39 outputs a demodulated bit value at each bit period. The value of each demodulated bit may be determined from the outputs of the MFB 37 at K different symbol (bit) periods, since the same bit position is considered K times at K different bit positions within the filter sequences.

In some embodiments, the incoming data may be further encoded, e.g. using a convolution-based forward error correcting (FEC) code. In such embodiments, the decision unit 39 may output the demodulated bits to a separate decoder, such as a Viterbi decoder, for decoding the encoded incoming data. In some embodiments, the sequence of detected hard bits may be fed to the decoder, while in other embodiments, the decision unit may output a sequence of demodulated soft bits (i.e. fractional values ranging from 0 to 1) to the decoder.

In some embodiments, the detected bits are fed back to the MFB 37 along a feedback path 41. In such embodiments, these bits may be used by the MFB 37 to help refine the filter sequences that the MFB 37 cross-correlates with the received samples—e.g. as described in WO 2019/207009.

The complex correlation coefficients from the matched filter bank 37 are also sent to the frequency estimator 35, while the data packet is demodulated. The frequency estimator 35 uses them to detect on-going frequency drift, subsequent to the initial frequency offset estimated by the preamble correlator 33. Such drift, if not corrected for, may negatively impact the performance of the demodulation. Estimates of frequency drift are used to send control signals to the frequency correction block 31.

The demodulated bit stream, output by the decision unit 39, may be stored in the memory 23 and/or may be processed further by the radio receiver 15 or by some other device, as appropriate. It may, in some applications, determine an output from the peripheral 27—e.g. decoded data from a variable message portion of a data packet may control what is displayed on a display screen of the receiver device 15.

Figure 3:
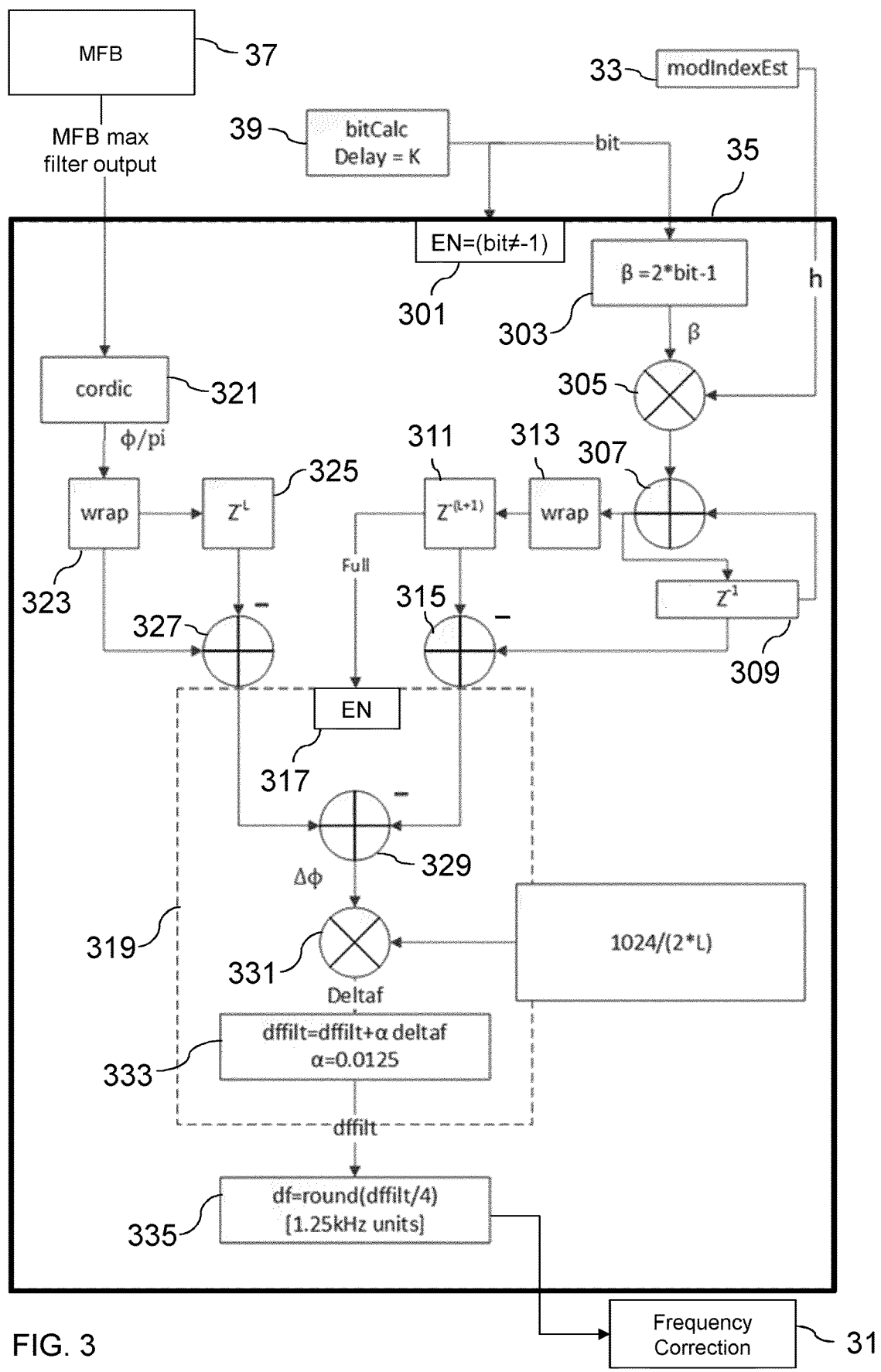
FIG. 3 is a schematic drawing of hardware logic within the frequency estimator of the radio receiver.

FIG. 3 provides more details of the frequency estimator block 35.

The frequency estimator 35 has an input for receiving the complex cross-correlation output of the highest-correlated filter within the MFB 37, at each bit period. It also has an input for receiving the stream of hard bit values output by the decision unit 39. It also has an input for receiving a signal representative of a modulation index estimate from the preamble correlator 33. It has an output for sending a frequency adjustment signal to the frequency correction block 31.

The frequency estimator block 35 enables frequency correction to be made based on the difference between the phase of the latest MFB output and the phase of the MFB output from L bits previously, with the detected bit history being used to generate an accumulated phase offset that is applied as a correction factor to remove the effect of the phase difference resulting from the L-bit delay between the two MFB outputs. [Note, this is not the same L as used above in the description of the preamble correlator 33.]

First, the mathematical underpinnings of the estimator 35 will be described, followed by a description of an exemplary hardware implementation.

System Model

A continuous-phase modulated signal, $x_m$, that is oversampled at ratio of R, can be modelled as $$x_{nR+r} = x_{nR} \exp\left\{j\pi h \beta_n \frac{r}{R}\right\}$$

$$= \sqrt{P_x} \exp\left\{j\pi h\left(\beta_n \frac{r}{R} + \sum_{l=0}^{n-1} \beta_l\right)\right\}$$

where:
- n indexes the current bit position within a data packet;
- r∈[0, R−1] indexes the samples within each bit, offset from a symbol (i.e. bit, in this example) timing anchor;
- j=√−1;
- h is the modulation index;
- $\beta_k$=2·$b_k$−1 is the sign of the instantaneous phase shift corresponding to bit $b_k$; i.e. with values in {−1, 1}, instead of {0,1}; and
- $P_x$ is the power at $x_0$.

The summand inside the exponential represents the accumulated phase offset of all the symbols leading up to the current symbol, accumulated over the whole bit stream thus far—i.e. from the first bit (l=0) of the data packet up to and including the bit (l=n−1) that immediately precedes the current bit (n).

In some cases, the transmitted signal may employ pulse-shaping, such as Gaussian filtering. In such cases this model is only approximate; however, it can still be possible for the coefficients of the MFB 37 to be based on this model and successfully demodulate such a signal.

The received signal is then given by $$y_{nR+r} = h x_{nR+r} + v_{nR+r}$$

where h is a complex number representing the channel gain and phase, and $v_{nR+r}$ is a noise term.

The MFB 37 detects this received signal by non-coherently correlating the sampled radio signal with $2^K$ filters that have coefficients corresponding to the modulated signal for all possible K-bit sequences.

Drift Tracking Algorithm

The MFB output, for a particular bit sequence b (as a complex number, before its magnitude is taken using the $|.|^2$ operation), at symbol time n, for a K-bit long filter that cross-correlates the received signal against the bit sequence $b=\{\beta_{n-K+1}, \ldots, \beta_n\}$, is given by $$d_n(b) \triangleq \sum_{k=n-K+1}^{n} \sum_{r=0}^{R-1} y_{Rk+r} \exp\left\{-j\pi h\left(\frac{r\beta_k}{R} + \sum_{l=n-K+1}^{k-1} \beta_l\right)\right\}$$

The outer summand adds K terms together to calculate the vector inner product. The middle summand adds the results of the R samples for each bit. The inner summand accumulates the phase offset due to the bits of the filter sequence that precede the current bit.

The particular bit sequence b that maximizes $|d_n(b)|^2$ is the noncoherent maximum likelihood estimate.

The received signal model $y_{Rk+r}$ can now be expanded, excluding noise, and making the assumption that there is no residual modulation index offset, and that the residual frequency offset $\delta_{f,n}$ is constant over the observation window of K symbols with value. The resultant phase shift equals $\theta + \delta_{f,n} \cdot n$, where $\theta$ is the relative phase shift due to the channel and is assumed constant over the packet. This gives:

$$d_n(b) = e^{j(\theta + 2\pi\delta_{f,n} n)} \sum_{k=n-K+1}^{n} \sum_{r=0}^{R-1} \exp\left\{j\pi h\left(\frac{r\beta_k}{R} + \sum_{l=0}^{k-1} \beta_l\right)\right\} \exp$$

$$\left\{-j\pi h\left(\frac{r\beta_k}{R} + \sum_{l=n-K+1}^{k-1} \beta_l\right)\right\}$$

$$= e^{j(\theta + 2\pi\delta_{f,n} n)} \sum_{k=n-K+1}^{n} \sum_{r=0}^{R-1} \exp\left\{j\pi h\left(\sum_{l=0}^{k-1} \beta_l - \sum_{l=n-K+1}^{k-1} \beta_l\right)\right\}$$

$$= e^{j(\theta + 2\pi\delta_{f,n} n)} \sum_{k=n-K+1}^{n} \sum_{r=0}^{R-1} \exp\left\{j\pi h\left(\sum_{l=0}^{n-K} \beta_l\right)\right\}$$

$$= KR \exp\left\{\theta + 2\pi\delta_{f,n} n + j\pi h\left(\sum_{l=0}^{n-K} \beta_l\right)\right\}$$

Assuming the MFB output bit sequence $b_{m,est}$ matches the correct bit sequence and the values of outputs $b_{n,mv}$ obtained from the majority vote bit detector 39, this last equation can be rearranged to give:

$$\delta_{f,n} n = \frac{1}{2\pi}\left\{\theta + j\pi h \sum_{l=0}^{n-K} \beta_{l,mv} - \arg\{d_n(b_{n,est})\}\right\}$$

This provides the basis for calculating an updated frequency estimate at every bit period, based on the difference in phase $d_n(b_{n,est})$ over L bits. Selecting L>1 provides better signal-to-noise ratio.

Assuming that the frequency is constant between bit n and bit n−L, then $$\delta_{f,n} =$$

$$\frac{1}{2\pi L}\left\{j\pi h\left(\sum_{l=0}^{n-K} \beta_{l,mv} - \sum_{l=0}^{n-L-K} \beta_{l,mv}\right) - \arg\{d_n(b_{n,est})\} + \arg\{d_{n-L}(b_{n-L,est})\}\right\}$$

$$\delta_{f,n} = \frac{1}{2\pi L}\left\{j\pi h\left(\sum_{l=n-L-K+1}^{n-K} \beta_{l,mv}\right) - \arg\{d_n(b_{n,est})\} + \arg\{d_{n-L}(b_{n-L,est})\}\right\}$$

Thus, the frequency estimator 35 generates a sequence of frequency drift estimates by keeping track of the cumulative sum of $b_{n,mv}$ in a shift register, and of the output phase $\arg\{d_n(b_{n,est})\}$ in another shift register, and providing logic to implement this equation. Note that the phase shift due to the channel $\theta$ has been subtracted away.

An alternative embodiment which requires slightly less memory just keeps track of the difference $$j\pi h\left(\sum_{l=0}^{n-K} \beta_{l,mv} - \arg\{d_n(b_{n,est})\}\right)$$

in a shift register.

Note that there is a time difference between when the cumulative bit sum and the phase difference are both available to be placed in the shift register.

The drift frequency is preferably updated at every bit, which is possible even when using a phase-offset observation window of L>1 bits. Experimentation has shown that a value of L=4 can produce good performance in some receivers.

Implementation

FIG. 3 shows a hardware circuit that implements this approach in the exemplary frequency offset estimator 35. Of course, many different hardware and/or software implementations are also possible.

A switch 301 activates the frequency estimator 35 as soon as the decision unit 39 starts outputting detected bits. By this time, the preamble correlator 33 has already determined timing information, an initial frequency offset estimate, and an estimate of the modulation index, h.

The hard decision bits, "bit", are clocked out of the decision unit 39 and into the frequency estimator 35. A first block 303 calculates β=2.bit−1 for each bit, and a multiplier 305 calculates the product of β and h.

This product is input to a detected-bit accumulating block 307-315, whose purpose is to calculate an updated phase adjustment value $$-\arg\{d_n(b_{n,est})\} + \arg\{d_{n-L}(b_{n-L,est})\}$$

at each successive bit period.

It uses an adding loop 307 and a single register 309 to accumulate the latest phase shift implied by the demodulated bit stream, while an L+1-position shift register 311 stores a history of the accumulated phase values over the preceding L bits. A wrap unit 313 ensures that these phase values are kept within the interval (−π,π]. A subtractor 315 calculates the phase difference between the latest demodulated bit and the demodulated bit from L bits previously.

Once the first L demodulated bits have passed through the demodulated-bit accumulating block 307-315, an enable signal ("Full") is sent to an activation switch 317 in a difference block 319.

This difference block 319 also receives a phase difference value calculated by a phase difference block 321-327 which acts on the output of the MFB 37 to calculate the term $$\left(\sum_{l=0}^{n-K} \beta_{l,mv} - \sum_{t=0}^{n-L-K} \beta_{l,mv}\right) = \left(\sum_{l=n-L-K+1}^{n-K} \beta_{l,mv}\right)$$

At each bit period, the latest complex output of the best-matched filter in the MFB 37 is passed through a CORDIC 321 which converts it to a phase value by calculating the arctan of the complex filter output. A wrap unit 323 puts this in the interval (−π,π]. This latest MFB phase value is stored in an L-position shift register 325. A subtractor 327 subtracts the L-bit-period delayed phase value at the end of the shift register 325 from the latest phase value. This phase difference value is passed to the difference block 319.

The difference block 319 contains a subtractor 329 which subtracts i) the phase adjustment value, received from the demodulated-bit accumulating block 307-315, from ii) the phase difference value received from the difference block 319. A multiplier 331 divides the answer by L (multiplied by 512 in this particular implementation, to keep precision in the fixed-point hardware) in order to convert the phase offset measured over L bit periods to a frequency offset value, "delta_f". A dampening unit 333 maintains a frequency adjustment value "dffilt" which is adjusted up or down in proportion to the delta_f, by a dampening factor α, to avoid sudden large changes in the frequency estimation. This adjustment value, dffilt, is scaled by a hardware-specific scaling unit 335 and sent as a control signal to the frequency correction block 31. A new control signal is sent every bit period.

Figure 4:
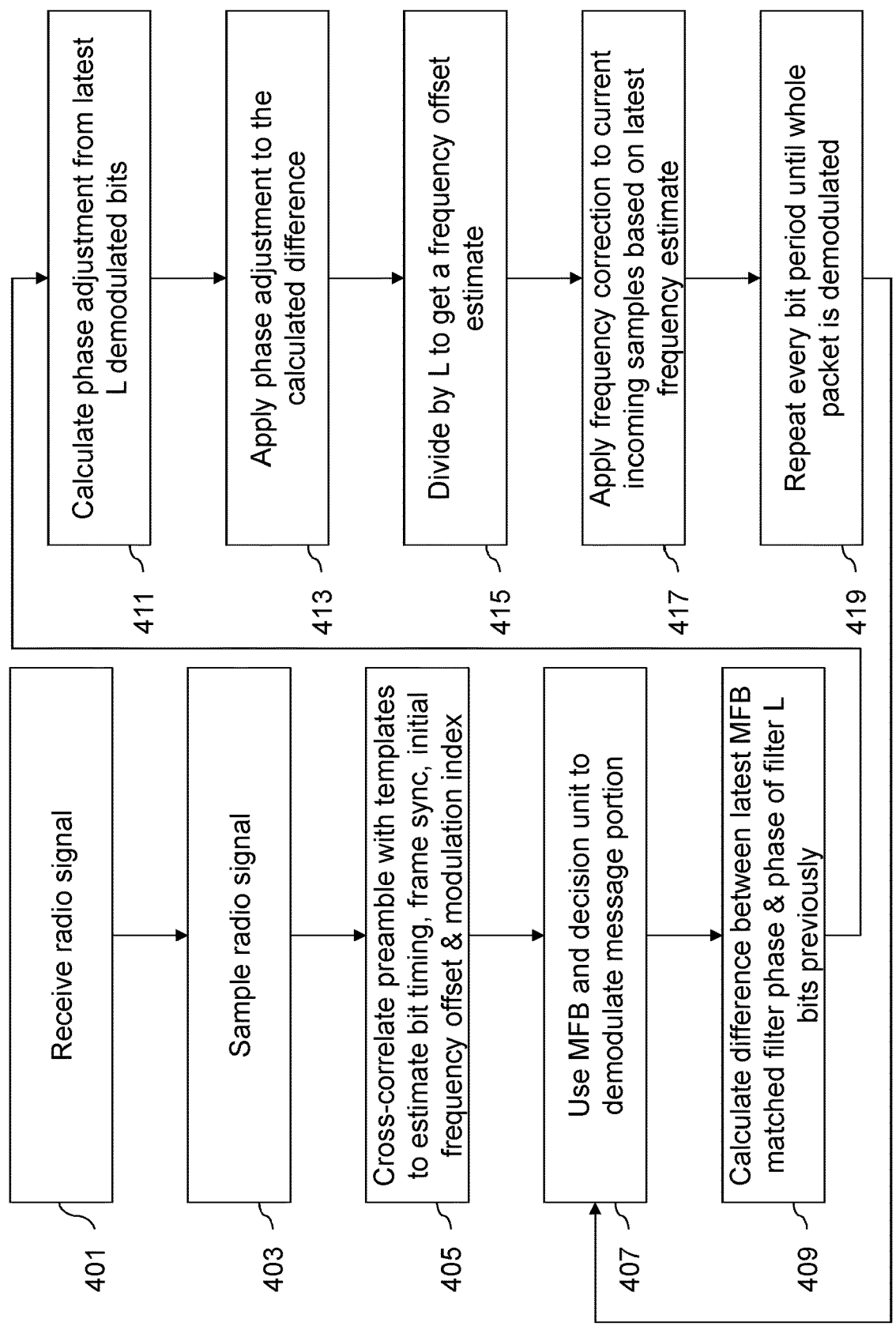
FIG. 4 is a flow chart of operations performed by the receiver circuitry of the radio receiver of FIG. 1.

FIG. 4 summarises some of the key steps in the demodulation process, performed using the SoC 17, with a focus on the novel frequency estimation process.

A physical radio signal is received 401 and sampled 403. The samples are cross-correlated 405 with a set of one or more templates to detect a preamble portion of the received packet, and to determine bit-level synchronization, frame-level synchronization, an initial frequency-offset estimate, and a modulation index estimate. The MFB 37 is used, in conjunction with decision circuitry 39, to demodulate 407 a message portion of the data packet. The frequency offset estimator 35 then calculates 409 the difference between the phase of the latest MFB best-matched filter output and the phase of the best-matched filter L bits previously. It also calculates 411 a phase adjustment value from the latest L demodulated bits output by the decision unit 39. It applies 413 this phase adjustment to the calculated difference (by adding or subtracting it, as appropriate), and divides 415 the answer by L to obtain an updated estimate of the frequency offset. The frequency correction block 31 uses the updated estimate to apply 417 frequency correction by rotating the incoming samples by a corresponding amount, to compensate for the frequency offset. This frequency estimation process is repeated 419 every bit period until the end of the data packet.

Simulation Results

Figure 5:
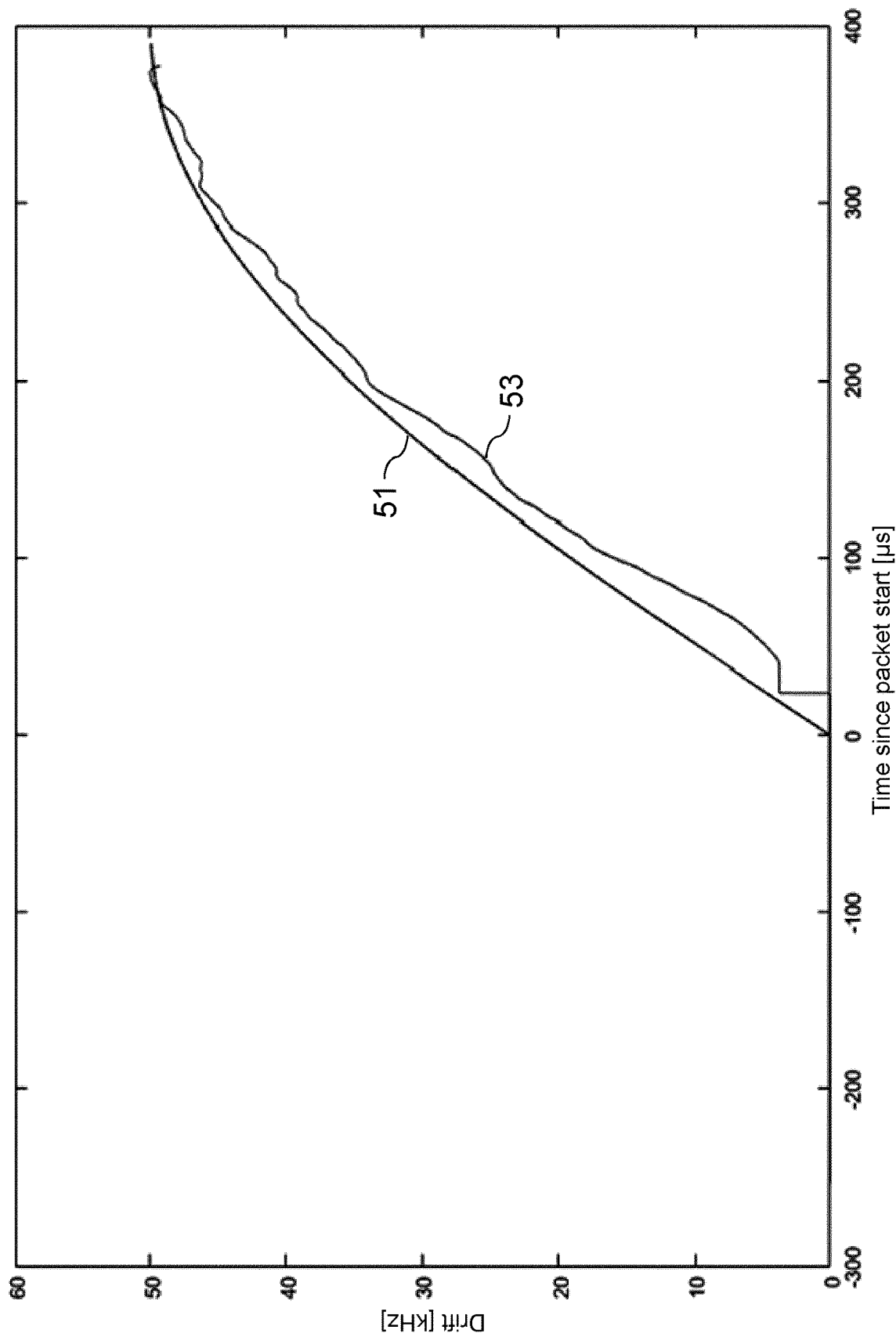
FIG. 5 is a graph of drift against time for a transmitter oscillator and for a corresponding frequency estimate generated by a first simulated receiver embodying the invention.

FIG. 5 shows the simulated performance of a radio receiver implementing the principles disclosed herein. The receiver uses a filter length of K=5 bits, a preamble correlation length of L=24, a phase difference observation window of length L=4 bits, a damping factor alpha=0.0125, a fixed modulation index of 0.5 with perfect modulation index estimation by the receiver, and zero initial frequency offset.

A first line 51 shows a simulated frequency drift in kHz against time, since the start of a data packet, as applied by the voltage-controlled oscillator (VCO) of the transmitter. A second line 53 shows the frequency offset estimated by the receiver as it receives this data packet. The graph shows that the receiver quite accurately follows the transmitter PLL induced frequency drift.

Figure 6:
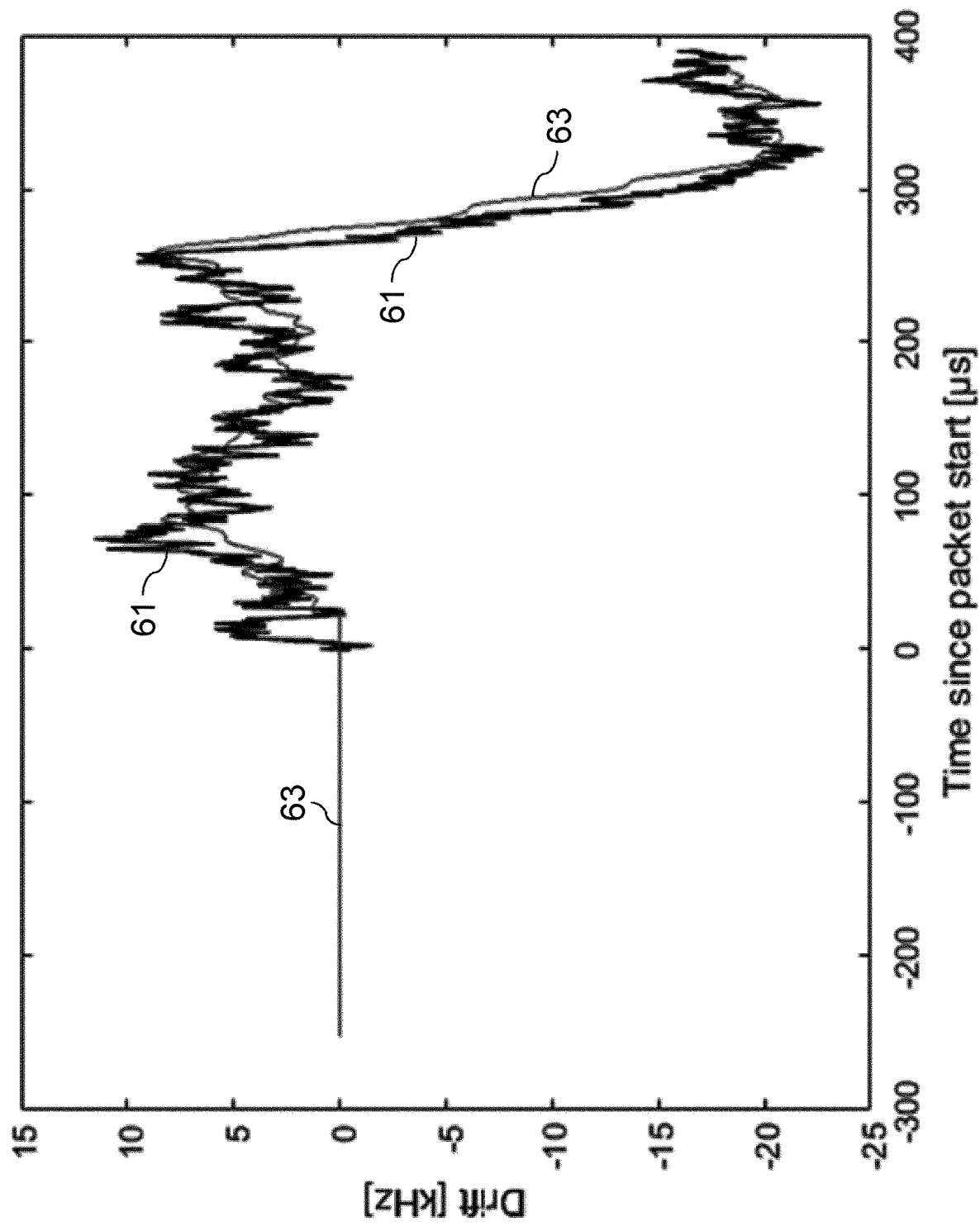
FIG. 6 is a graph of drift against time for a transmitter oscillator and for a corresponding frequency estimate generated by a second simulated receiver embodying the invention.

FIG. 6 shows the simulated performance of the same communication system when a random drift is applied to the transmitter frequency. A first line 61 shows the true transmitter frequency drift, while the second line 63 shows the receiver's estimate of the frequency offset obtained using the principles disclosed herein. There is an initial period of at least K+L=9 bit periods, while the decision logic and shift registers are filing, when the receiver (incorrectly) outputs a zero offset, but thereafter the receiver estimate reliably tracks the actual frequency drift, subject to some low-pass filtering provided by the damping factor, alpha.

Bluetooth Low Energy™ (BLE) Simulation

A BLE channel was simulated with a "dirty" transmitter exhibiting a frequency drift of −200 Hz/μsec, using the "dirty" simulation parameter specified for Bluetooth™. The modulation index was maintained at 0.5. An initial frequency offset of 0 Hz was applied. The MFB is of size K=5.

It has been recognised that the present approach can be used to compensate for error in the preamble correlator. Performance was therefore simulated for smaller preamble correlator lengths. Values of L=4, ∝=0.125 were used in the frequency offset estimator. Simulations were performed for 100 packets and the average of the four resulting sensitivities were used. In addition, as the sync timing is also affected by reducing the length of the preamble correlator, simulation was also performed with a genie strobe (i.e. perfect timing synchronisation was assumed).

The following table shows drift calculation performance for various preamble correlator lengths, in BLE 1 Mbps mode, with $h_{TX}$=0.5, K=5, frequency offset 0 Hz, L=4, alpha=0.125:

| Channel | Drift Correction | Preamble correlator length | Sensitivity (dBm) | Preamble failures (%) | Sensitivity (dBm) Genie Strobe | Preamble failures (%) |
|---|---|---|---|---|---|---|
| Dirty | Off | 16 | Never | | | |
| Dirty | On | 16 | −98.01 | 5.5 | −98.04 | 2 |
| Clean | Off | 24 | −98.11 | 8.5 | −98.20 | 0.5 |
| Clean | On | 24 | −98.04 | 2 | −98.21 | 1.5 |

It can be seen that there is negligible performance loss between the dirty and clean transmitters. In addition, the drift calculation does a very good job of correcting the residual frequency offset from the preamble correlator.

The drift calculation is dependent on the modulation index estimate, so simulations were performed to see if this produces some further detriment over the case where no drift is present. Simulations were performed for a value of transmitter modulation index $h_{TX}$=0.45, but keeping the receiver estimate fixed at $h_{RX}$=0.5, and setting the two difference values of the modulation index $h_{Drift}$=0.45 for the drift calculation. A value of $h_{RX}$=0.5 was set to consider embodiments in which no modulation index estimation is performed; if it is performed, it would be straightforward to look at the drift correction.

The following table shows drift calculation performance for various preamble correlator lengths, in BLE 1 Mbps mode, with $h_{TX}$=0.45, $h_{RX}$=0.45, K=5, frequency offset 0 Hz, L=4, alpha=0.125, over 100 packets:

| Channel | Drift Correction | Preamble correlator length | Sensitivity (dBm) $h_{Drift}$ = 0.5 | Sensitivity (dBm) $h_{Drift}$ = 0.45 |
|---|---|---|---|---|
| Clean | Off | 24 | −97.04 | −97.19 |
| Clean | On | 24 | −97.21 | −97.26 |
| Dirty | On | 16 | −96.77 | −97.11 |
| Dirty | On | 20 | −96.87 | −96.84 |
| Dirty | On | 24 | −97.08 | −97.16 |

It can be seen that there was up to around 0.3 dB improvement when the drift calculation had a correct estimate of the modulation index. When drift calculation was turned on in the clean case there was around a 0.1 dB improvement in performance. There are at least two possible responses to this: modulation index estimation, or factoring out the influence of a modulation index offset. For the latter, the drift calculation can be updated only if the number of zeros and ones is equal over the L symbol observation. This happens for 6 of the 16 possible sequences for L=4. So a simulation was performed of multiplying the value of alpha by 16/6 to compensate.

The following table shows drift calculation performance for various preamble correlator lengths, in BLE 1 Mbps mode, with $h_{TX}$=0.45, $h_{RX}$=0.5, $h_{Drift}$=0.5, K=5, frequency offset 0 Hz, L=4, alpha=0.125*(16/6), over 100 packets:

| Channel | Preamble correlator length | Sensitivity (dBm) |
|---|---|---|
| Dirty | 16 | −97.02 |
| Dirty | 20 | −97.13 |
| Dirty | 24 | −97.09 |

It can be seen that the one-zero count method appears to work well, and the performance is about the same as when having a perfect drift estimation.

Although some of the above disclosure has been described in the context of binary symbols (i.e. bits), it will be appreciated that the same principles can also be applied to systems that use higher-order modulation, such as quadrature modulation, where each symbol may have four or more possible values.

It will be appreciated by those skilled in the art that the invention has been illustrated by describing various specific embodiments thereof, but is not limited to these embodiments; many variations and modifications are possible, within the scope of the accompanying claims.

The invention claimed is:

1. A receiver system comprising:
   a matched filter bank;
   decision logic; and
   a frequency offset estimator,
   wherein:
   the matched filter bank comprises an input for receiving data representative of a frequency- or phase-modulated signal;
   the decision logic is configured to generate a sequence of demodulated symbol values from outputs of the matched filter bank;
   the frequency offset estimator is configured to:
   determine a first phase value from a first output of the matched filter bank;
   determine a second phase value from a second output of the matched filter bank, wherein the second output is offset from the first output by an offset number, L, of symbol periods;
   determine a phase adjustment value from an L-symbol subsequence within the sequence of demodulated symbol values, wherein each of the L symbol values is determined at least in part from a respective one or more values output by the matched filter bank during a time interval from the first output to the second output; and
   generate a frequency offset estimate by estimating a frequency offset in dependence on the difference between i) the first phase value plus the phase adjustment value and ii) the second phase value.

2. The receiver system of claim 1, wherein the frequency offset estimator is configured to generate the frequency offset estimate in dependence on data representative of one or more symbol positions in the frequency- or phase-modulated signal for which the decision logic has not yet determined respective demodulated symbol values.

3. The receiver system of claim 1, wherein the matched filter bank comprises a bank of filters having a common filter length.

4. The receiver system of claim 1, wherein the frequency offset estimator is configured to generate a succession of frequency offset estimates at intervals.

5. The receiver system of claim 1, configured to use the frequency offset estimate to apply a frequency-offset compensation operation to the data representative of the frequency- or phase-modulated signal.

6. The receiver system of claim 1, configured to use the frequency offset estimate to control an analogue or digital local oscillator signal.

7. The receiver system of claim 1, comprising a correlator configured to determine an initial frequency offset estimate by cross-correlating at least some of the data representative of the signal against one or more templates.

8. The receiver system of claim 1, wherein the frequency offset estimator is configured to determine the first phase value from an output of a first best-matched filter of the matched filter bank, and is configured to determine the second phase value from an output of a second best-matched filter of the matched filter bank, wherein the second best-matched filter can be different from the first best-matched filter.

9. The receiver system of claim 1, wherein the first and second outputs comprise respective complex correlation coefficients, and wherein the frequency offset estimator comprises a coordinate-rotation digital computer (CORDIC) circuit for determining the first and second phase values from the first and second outputs.

10. The receiver system of claim 1, wherein the frequency offset estimator comprises a shift register for storing one or more phase values, and is configured to determine phase values at regular intervals and to load each successive phase value into the shift register, and wherein the frequency offset estimator further comprises a subtractor configured to subtract an oldest phase value from the shift register from a phase value determined L symbol periods later.

11. The receiver system of claim 1, wherein the offset number L is greater than one.

12. The receiver system of claim 1, wherein the frequency offset estimator is configured to generate the frequency offset by subtracting the second phase value from the first phase value, and by subtracting the phase adjustment value.

13. The receiver system of claim 12, wherein the offset number L is an integer power of two and wherein the frequency offset estimator is configured to use bit-shifting to divide the difference between i) the first phase value plus the phase adjustment value and ii) the second phase value, by the offset number L.

14. The receiver system of claim 1, wherein the frequency- or phase-modulated signal is modulated with binary data, and wherein the frequency offset estimator is configured to determine the phase adjustment value by summing a succession of values, wherein each value is selected to be a constant positive value or a constant negative value in dependence on whether each successive demodulated bit is a one or a zero.

15. The receiver system of claim 1, configured to receive or generate a modulation index parameter and to this parameter when calculating the phase adjustment value.

16. The receiver system of claim 1, wherein the frequency offset estimator is configured to determine the phase adjustment value by storing L phase-shift values in an L-symbol-long shift register, wherein each stored phase-shift value is calculated as a sum of L respective values, each of which depends on a respective demodulated symbol value in the sequence of demodulated symbol values, and to add each phase-shift value that is clocked out of the shift register to an accumulated phase-shift value to provide the phase adjustment value.

17. The receiver system of claim 1, wherein the decision logic comprises majority-vote logic and wherein each demodulated symbol is determined based on a plurality of outputs of the matched filter bank from a plurality of different times.

18. The receiver system of claim 1, wherein the frequency- or phase-modulated signal is a radio signal, and wherein the receiver system comprises radio receiver circuitry for generating the data representative of the frequency- or phase-modulated signal from the received radio signal.

19. The receiver system of claim 1, wherein the receiver system is an integrated-circuit chip comprising a processor and radio receiver circuitry, and wherein the matched filter bank, the decision logic and the frequency offset estimator are implemented as dedicated hardware circuits distinct from the processor.

20. A method of estimating a frequency offset in a receiver system that is configured to:
provide data representative of a frequency- or phase-modulated signal to a matched filter bank; and
generate a sequence of demodulated symbol values from outputs of the matched filter bank,
the method comprising:
determining a first phase value from a first output of the matched filter bank;
determining a second phase value from a second output of the matched filter bank, wherein the second output is offset from the first output by an offset number, L, of symbol periods;
determining a phase adjustment value from an L-symbol subsequence within the sequence of demodulated symbol values, wherein each of the L symbol values is determined at least in part from a respective one or more values output by the matched filter bank during a time interval from the first output to the second output; and
estimating a frequency offset in dependence on the difference between i) the first phase value plus the phase adjustment value and ii) the second phase value.

* * * * *